United States Patent [19]

Laylock et al.

[11] Patent Number: 4,627,302
[45] Date of Patent: Dec. 9, 1986

[54] COUNTERSHAFT TRANSMISSION

[75] Inventors: Rick A. Laylock, Washington; Michael R. Theobald, Princeville, both of Ill.

[73] Assignee: Caterpillar Inc., Peoria, Ill.

[21] Appl. No.: 780,140

[22] Filed: Sep. 26, 1985

[51] Int. Cl.$^4$ ............................................. F16H 3/08
[52] U.S. Cl. ........................................ 74/360; 74/359
[58] Field of Search ................. 74/360, 359, 357, 356

[56] References Cited

U.S. PATENT DOCUMENTS

| | | | |
|---|---|---|---|
| 2,511,039 | 6/1950 | Black et al. | 74/359 X |
| 2,719,440 | 10/1955 | Banker | 74/359 X |
| 2,867,126 | 1/1959 | Bolster | 74/360 |
| 3,377,876 | 4/1968 | Finke et al. | 74/360 |
| 3,425,293 | 2/1969 | Krawczyk et al. | 74/360 |
| 3,465,609 | 9/1969 | Fisher et al. | 74/360 |
| 3,886,815 | 6/1975 | Eastwood | 74/360 X |
| 3,893,345 | 7/1975 | Sisson et al. | 74/360 X |
| 3,913,411 | 10/1975 | Jameson | 74/360 |
| 3,916,714 | 11/1975 | Sisson et al. | 74/360 X |
| 4,341,127 | 7/1982 | Stodt | 74/360 X |
| 4,392,391 | 7/1983 | Jameson et al. | 74/360 X |
| 4,570,503 | 2/1986 | Theobald | 74/360 |

FOREIGN PATENT DOCUMENTS 1097465  1/1961  Fed. Rep. of Germany ........ 74/360
3337480  4/1984  Fed. Rep. of Germany ........ 74/359

OTHER PUBLICATIONS

Exhibit A—Schematic View of a Komatsu 510 Countershaft Transmission—Circa 1977.
SAE Pub. No. 720387, Apr. 10–12, 1972, entitled "Design and Development of the Funk 1000 Transmission".

Primary Examiner—Kenneth J. Dorner
Assistant Examiner—Dirk Wright
Attorney, Agent, or Firm—Charles E. Lanchantin, Jr.

[57] ABSTRACT

A countershaft transmission provides two forward and two reverse speeds using an input shaft, an output shaft, an intermediate shaft, four rotating clutch assemblies, and seven gears. The directional clutch assemblies are mounted in back-to-back relation on the input shaft, the first speed clutch assembly is mounted on the output shaft, and the second speed clutch assembly is mounted on the intermediate shaft. Three of the clutch assemblies are radially aligned, and the output shaft includes a coupling substantially radially aligned with the remaining clutch assembly. A brake mechanism for stopping rotation of the output shaft is provided on the intermediate shaft in substantial radial alignment with the coupling. The transmission is relatively compact axially as well as radially, and is easy to assemble in a housing having two major portions.

18 Claims, 2 Drawing Figures

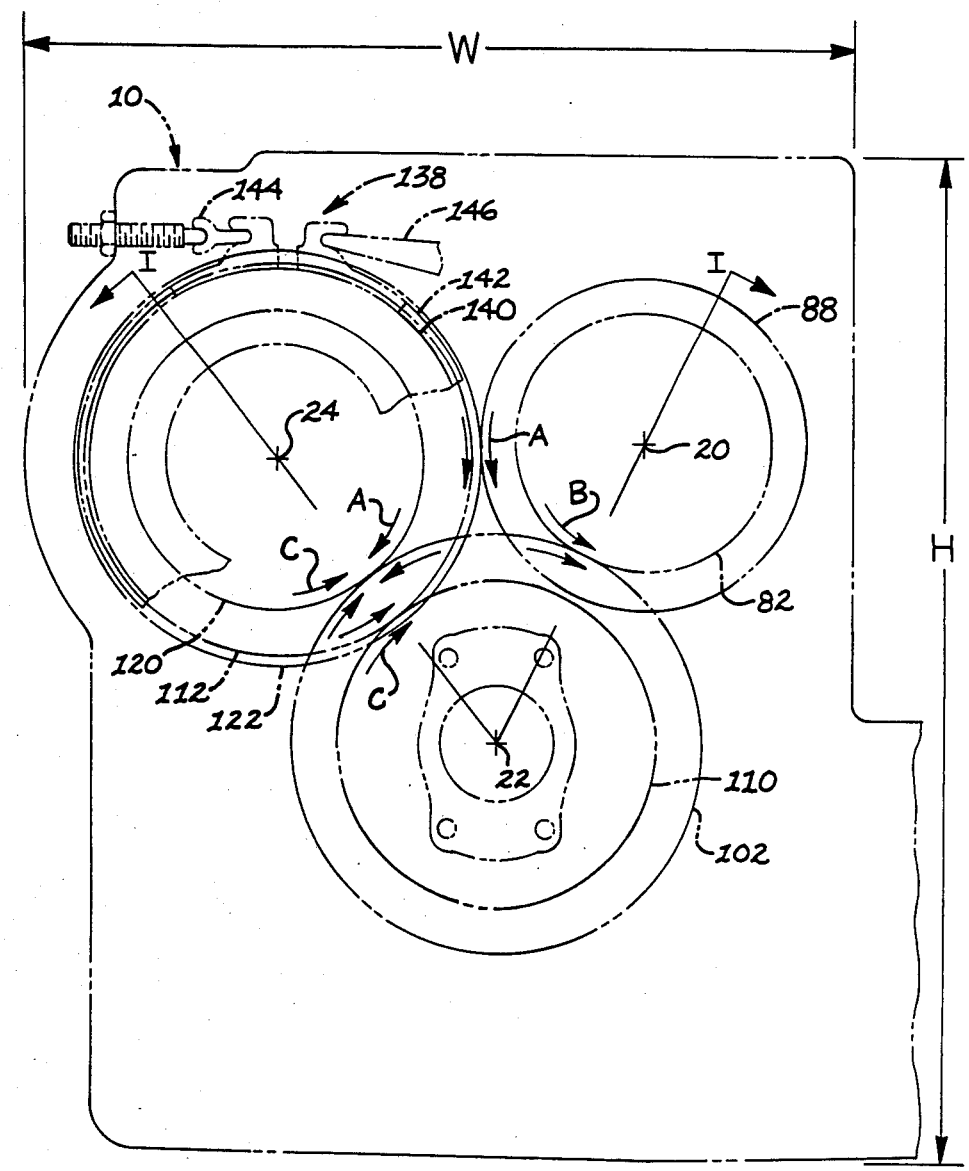

COUNTERSHAFT TRANSMISSION

TECHNICAL FIELD

This invention relates generally to a countershaft transmission for a vehicle or the like, and more particularly to an especially compact countershaft transmission having a plurality of fluid actuated, rotating clutches of the interleaved multiple plate and disc type.

BACKGROUND ART

Countershaft transmissions having a plurality of speed ratios in each direction of operation are particularly useful in the drive line of heavy duty vehicles such as wheel loaders, rubber tired log skidders, and lift trucks. Such transmissions are advantageous in that a plurality of rotating clutches and associated continually meshing gears can be so positioned on the usual parallel shafts as to allow considerable design flexibility and an adaptability to the elevational drop requirement between the input and output axes.

One of the problems with such countershaft transmissions is that they have required too many shafts or gears. For example, many of them have an extra idler gear in order to provide the reversing function. This requires an additional bearing system along another axis parallel to that of the primary shafts at increased expense.

Another problem with these prior countershaft transmissions is that they have been axially too long. One reason for this is that some of them have incorporated two juxtaposed rotating clutches and two gears along the output shaft axis, so that the added coupling member required to releasably couple the output shaft to the vehicle drive line adds excessive length at that point. Still other transmissions have included housing structures with internal walls or rotating clutches located axially beyond the walls, and both of these constructions have undesirable overall lengths.

Accordingly, what is needed is a structurally simple, and both radially and axially compact countershaft transmission providing at least two forward and two reverse speeds using a maximum of three shafts, a minimum number of gears, and four rotating clutches. Preferably, the construction should provide room on the output shaft for a releasable coupling member without unduly contributing to the transmission's overall length at that location.

Moreover, the desired countershaft transmission should preferably maximize parts commonality by using similarly sized rotating clutch elements, and have a long service life by designing the elements and their connections such that undesirably high operating speeds or clutch plate engagement speeds are avoided. And, the shafts, gears and rotating clutches should be so arranged as to fit axially between the front and rear walls of a separable housing in order to allow convenient assemby and disassembly thereof.

DISCLOSURE OF THE INVENTION

The present invention is directed to overcoming one or more of the above problems.

In one aspect of the invention there is provided a countershaft transmission including an input shaft, an output shaft and an intermediate shaft arranged in parallel relation, forward and reverse clutch assemblies mounted on the input shaft, a first speed clutch assembly mounted on the output shaft, a second speed clutch assembly mounted on the intermediate shaft, and a plurality of gears mounted on the shafts and operatively associated with each other for providing two forward and two reverse speeds upon selective actuation of the clutch assemblies.

In another aspect of the present invention there is provided a countershaft transmission having an input shaft, an output shaft and an intermediate shaft arranged in parallel. First and second gears are mounted for free rotation on the input shaft and first and second clutch assemblies are provided for selectively connecting the first and second gears respectively to the input shaft. A third gear is mounted for free rotation on the output shaft and a third clutch assembly is provided for selectively connecting the third gear to the output shaft. A fourth gear is mounted for free rotation on the intermediate shaft and a fourth clutch assembly is provided for selectively connecting the fourth gear to the intermediate shaft. A fifth gear is mounted for rotation with the output shaft, and sixth and seventh gears are mounted for rotation with the intermediate shaft, with the first and third gears, the third and sixth gears, the second and seventh gears, and the fourth and fifth gears being intermeshingly engaged with each other.

In a still further aspect of the invention there is provided a countershaft transmission having parallel input, output and intermediate shafts and first, second and third clutch assemblies arranged on the input, output and intermediate shafts respectively in substantial radial alignment. A fourth clutch assembly is arranged on the input shaft, gear means are mounted on the shafts for effecting two forward and two reverse speeds at the output shaft in response to actuation of the respective clutch assemblies, and an output shaft coupling is advantageously positioned in substantial radial alignment with the fourth clutch assembly.

The instant transmission features the substantial radial alignment of both of the speed clutch assemblies with one of the directional clutch assemblies so that the releasable output shaft coupling member can be radially aligned with the remaining directional clutch assembly. Advantageously, an output shaft brake mechanism can also be located on the intermediate shaft in radial alignment with the remaining directional clutch assembly to provide a particularly compact and economical package.

BRIEF DESCRIPTION OF THE DRAWINGS

FIG. 2 is a diagrammatic, rear end elevational view in phantom of certain elements of the countershaft transmission of FIG. 1 showing the elevational relationship of the various shaft axes, the constantly meshing gearing associated therewith, a fragmentary view of the brake mechanism, and the cutting plane of developed FIG. 1.

BEST MODE FOR CARRYING OUT THE INVENTION

Figure 1:
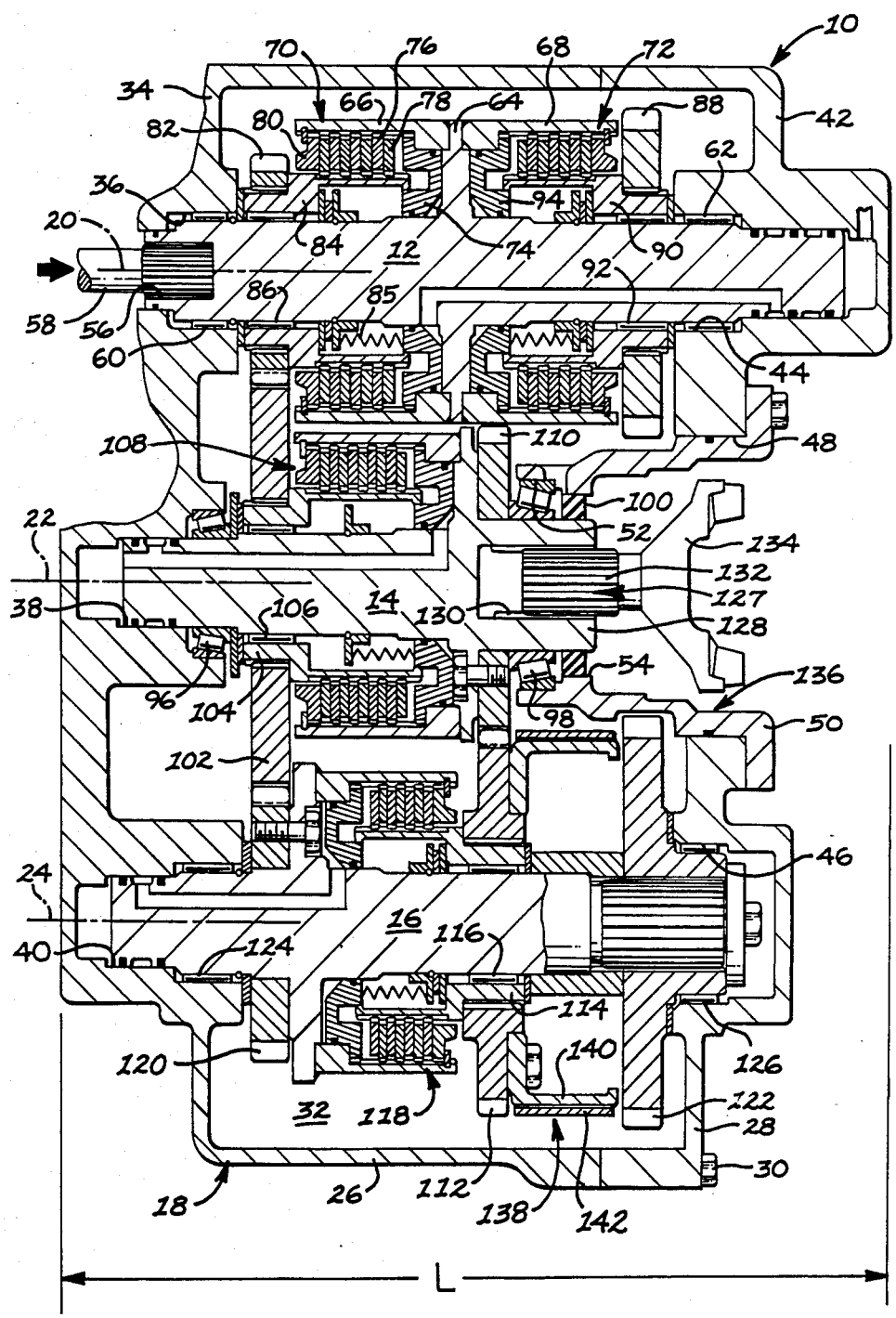
FIG. 1 is a diagrammatic, developed sectionalized view of a two-speed forward and two-speed reverse countershaft transmission constructed in accordance with invention.

Referring to FIG. 1, there is shown a countershaft transmission 10 having an input shaft 12, an output shaft 14, and a third or intermediate shaft 16 rotatably supported in a housing 18. The shafts 12, 14 and 16 are rotatably mounted within the housing respectively along parallel axes 20, 22 and 24, and have an elevational rear end view relationship as is illustrated in FIG. 2. In the instant embodiment the input shaft axis 20 is approximately at the same elevation as or in a common horizontal plane with the intermediate shaft axis 24, and the output shaft axis 22 is located below them and about half way between them in a relatively compact triangular pattern.

The housing 18 is generally constructed of two major pieces including a front main case portion 26 and a rear cover portion 28 located at the left and right respectively when viewing FIG. 1. A plurality of threaded fasteners 30 positively secure the case and cover portions together, and this serves to define a sealed internal chamber 32 between them. A front wall 34 of the main case portion defines a stepped cylindrical bore 36 on the input axis 20, and blind cylindrically shaped stepped pockets 38 and 40 on the output and intermediate axes 22 and 24 respectively. In a similar manner, a rear wall 42 of the cover portion defines blind cylindrically shaped stepped pockets 44 and 46 on the input axis 20 and on the intermediate axis 24, and a relatively large cylindrical bore 48 on the output axis 22. Advantageously, each of the pockets is constructed so as to distribute operating fluid and cooling fluid from passages in the housing to passages in the shafts in the usual manner, although not fully illustrated. The bore 48 is adapted to releasably receive an annular bearing cage and seal carrier 50 having an inner bearing seat 52 and an outer seal seat 54.

Preferably, input shaft 12 has a front internal spline 56 for releasable connection with a driven output shaft 58 of a conventional engine driven hydrodynamic torque converter, not shown. The front end of the input shaft is rotatably supported in the stepped cylindrical bore 36 by a needle or roller bearing assembly 60, and the rear end is rotatably supported in the stepped pocket 44 by a similar needle or roller bearing assembly 62. An annular web 64 is integrally connected to the input shaft centrally thereof, and an internally splined front drum 66 and an internally splined rear drum 68 are integrally connected to the web. The drums 66 and 68 respectively form the driven members of a reverse clutch assembly 70 and a forward clutch assembly 72 of the usual interleaved multiple plate and disc type which are essentially disposed in juxtaposed back-to-back relation. For example, the front or reverse clutch assembly 70 includes an annular actuating piston 74 selectively movable to the left under fluid pressure in a normal manner when viewing FIG. 1 in order to clamp a plurality of interleaved annular plates 76 and friction discs 78 against a reaction plate 80. This connects a first gear 82 and its associated hub assembly 84 for conjoint rotation with the input shaft. The reverse clutch assembly 70 is positively disengaged by movement of the actuating piston 74 back to the right by a plurality of compression springs 85 when pressure is reduced to the actuating piston. This allows the first gear 82 and the hub assembly 84 to freely rotate together on an intermediate needle or roller bearing assembly 86 mounted on the input shaft.

A second gear 88 and a hub assembly 90 splined thereto are also freely rotatably mounted by a needle or roller bearing assembly 92 on the rear portion of the input shaft 12. Movement of another actuating piston 94 of the forward clutch assembly 72 to the right when viewing the drawing will similarly couple the second gear 88 and the hub assembly 90 to the input shaft.

Thus, actuation of either one of the directional clutch assemblies 70 and 72 is effective to provide a positive drive to either one of the gears 82 and 88 from the input shaft 12. In this regard it should be appreciated that the designation of clutch assemblies 70 and 72 as being reverse and forward respectively is arbitrary and could be as easily considered as forward and reverse respectively.

Turning now to the output shaft 14, it can be noted to be supported in the stepped pocket 38 of the front wall 34 by a tapered roller bearing assembly 96, and it is supported in the rear carrier 50 by an oppositely cooperating tapered roller bearing assembly 98 mounted on the inner bearing seat 52. An annular seal 100 extends between the carrier and the output shaft rearwardly of the bearing assembly 98. A third gear 102 and an associated hub assembly 104 are mounted for free rotation on a needle or roller bearing assembly 106 on the front of the output shaft in an intermeshing relationship with the first gear 82 on the input shaft 12, and the third gear is selectively coupled for joint rotation with the output shaft by a first speed clutch assembly 108. Furthermore, a fifth gear 110 is releasably secured to the rear of the output shaft for conjoint rotation therewith.

A fourth gear 112 and its associated hub assembly 114 are freely rotatably mounted centrally on the third or intermediate shaft 16 by a needle or roller bearing assembly 116. The fourth gear 112 is continuously intermeshed directly with the fifth gear 110, and is selectively coupled to the intermediate shaft by actuation of a second speed clutch assembly 118. A sixth gear 120 is releasably mounted on the front of the intermediate shaft for joint rotation therewith, and a seventh gear 122 is releasably mounted on the rear of the intermediate shaft for joint rotation therewith. The sixth gear 120 is directly intermeshed with the third gear 102, and the seventh gear 122 is directly intermeshed with the second gear 88 as can be best visualized by reference to FIG. 2. Like the input shaft 12, the intermediate shaft 16 is rotatably supported in the front pocket 40 by a needle or roller bearing assembly 124, and in the rear pocket 46 by a needle or roller bearing assembly 126.

The first and second speed clutch assemblies 108 and 118 are similar in construction to the directional clutch assemblies 70 and 72 and therefore need not be described in detail. In fact, it is preferred that all of the clutch assemblies have the same preselected diameter so that the size of the plates and discs, the actuating pistons, and several other members thereof can be advantageously the same for improved parts commonality. It should be understood that other forms of hydraulically engaged and spring disengaged clutch assemblies can be utilized without departing from the spirit of the present invention.

Advantageously, the countershaft transmission 10 rotatably supports the rear portion of the output shaft 14 on the bearing assembly 98 and the carrier 50 at a relatively forwardly located position. This enables output shaft coupling means 127 to be located in substantial radial alignment with the forward clutch assembly 72, or in a generally centrally located position adjacent fifth gear 110. The coupling means 127 includes an axially foreshortened rear portion 128 of the output shaft and defines an internal spline 130 thereat for effective mating engagement with an external spline 132 defined on a releasable coupling member such as a conventional U-joint yoke 134. Note that the carrier 50 defines an outwardly facing, stepped annular cavity 136 which is in substantial radial alignment with the second and seventh gears 88 and 122, and this construction permits the U-joint yoke 134 to be located fully therewithin at a relatively forward location so that the axial length of the countershaft transmission is limited in the region of the output shaft.

Another feature of the countershaft transmission 10 is the internal incorporation of an output shaft brake mechanism 138 on the intermediate shaft axis 24. The brake mechanism is preferably of conventional construction such as one having a cylindrical brake drum 140 releasably secured to the fourth gear 112. Since the fourth gear is continuously intermeshed with the fifth gear 110 conjointly secured to the output shaft 14, anything retarding or stopping the fourth gear will retard or stop the output shaft. As can be visualized by reference to FIG. 2, the brake mechanism 138 includes a depending brake band 142 that substantially surrounds the brake drum 140. The generally C-shaped band is suspended between an adjustable anchor 144 at one end and an actuating portion 146 at the other in a conventional manner. Leftward movement of the actuating portion 146 when viewing FIG. 2 by a suitable control mechanism, not shown, will serve to clamp the band against the drum and retard movement of the gears 110 and 112 and thereby the output shaft.

Industrial Applicability

In operation, the input shaft 12 of the countershaft transmission 10 is driven by the converter output shaft 58 in, for example, a counterclockwise direction when viewing along the input axis 20 from the rear of the transmission. Assuming that a first speed forward condition is desired, the operator so controls the vehicle as to cause the forward clutch assembly 72 and the first speed clutch assembly 108 to be hydraulically actuated so as to clamp the respective interleaved plates and discs thereof together. This connects the second gear 88 to the input shaft 12 and the third gear 102 to the output shaft 14. Accordingly, the output shaft is driven at a relatively low speed ratio by way of the gear pairs 88-122 and 120-102. As shown by the arrows identified by the letters A in FIG. 2 and indicating the direction of rotation of these gear pairs, the output shaft is driven in a counterclockwise direction or in the same direction as the input shaft.

It is only necessary to disengage the first speed clutch assembly 108 and to engage the second speed clutch assembly 118 in order to shift the transmission 10 from first to second speed forward. In that mode, the speed reduction ratio is reduced and the output shaft is driven at a higher speed by way of the gear pairs 88-122 and 112-110.

In the first speed reverse condition only the reverse clutch assembly 70 and the first speed clutch assembly 108 are engaged. Torque is thereby transmitted substantially more directly to the output shaft 14 via the gear pair 82-102. In this instance the output shaft is driven in a rotational direction opposite to that of the input shaft as may be visualized by reference to the directional arrows identified by the letter B in FIG. 2.

In the second speed reverse mode, the reverse clutch assembly 70 and the second speed clutch assembly 118 are engaged, and the torque is transmitted to the output shaft via the three gear chain 82-102-120 and the gear pair 112-110. In this instance the freewheeling third gear 102 serves as an idler so that the output shaft is driven in a rotational direction opposite to that of the input shaft as can be appreciated by reference to the direction arrows identified by the letters B and C in FIG. 3.

The number of gear teeth and the corresponding reduction ratios obtained with one embodiment of the countershaft transmission 10 are shown by the charts immediately below:

| Number of Gear Teeth |
| --- |
| Gear 82:33 teeth |
| Gear 88:41 teeth |
| Gear 102:64 teeth |
| Gear 112:57 teeth |
| Gear 110:47 teeth |
| Gear 120:40 teeth |
| Gear 122:52 teeth |

| Gear Reduction Ratio | | |
| --- | --- | --- |
| | Forward | Reverse |
| First Speed | 2.03 | 1.94 |
| Second Speed | 1.05 | 1.00 |

The substantial radial alignment of the first and second speed clutch assemblies 108 and 118 with one of the directional clutch assemblies 70 and 72 at the front of the countershaft transmission, combined with the substantial radial alignment of the other one of the directional clutch assemblies with the output coupling means 127 and the brake mechanism 138 at the rear of the countershaft transmission is such as to define a particularly axially compact package as can be appreciated by reference to FIG. 1 and the overall length "L" indicated. By the term "substantial radial alignment" it is meant that the named components are so axially positioned on the respective shafts 12, 14 and 16 as to be laterally located in a common theoretical plane transverse to the axes 20, 22 and 24. Since the parallel axes are arranged in an almost equalateral triangular manner as is illustrated in FIG. 2, the package is also radially compact as indicated by the transverse width "W" designation and the overall height "H" designation marked thereon. Note, for example, that the input and intermediate shafts 12 and 16 are located substantially in horizontal alignment, with the output shaft 14 being located below them and generally centrally between them.

While the relatively short length "L" of the transmission 10 is obtained with the aforementioned radial alignment of certain components, the two-piece housing 18 and its bores 36, 48 and pockets 38, 40, 44 and 46 in the opposite walls 34, 42 allows convenient assembly and disassembly of the shafts and associated members rotatably mounted thereon.

In view of the foregoing, it is apparent that the countershaft transmission 10 is simple, rugged and of lightweight construction because of its compactness. Two forward and two reverse speeds are obtainable through four clutch assemblies 70, 72, 108, and 118 and seven gears 82, 88, 102, 110, 112, 120 and 122. And, furthermore, the U-joint yoke 134 is located axially forwardly or inwardly such that it is laterally in substantial longitudinal alignment with one of the directional clutches 70, 72. This makes the transmission particularly axially compact along the output axis so that it can be more conveniently coupled to the vehicle drive line in the limited space allowed. The internal incorporation of the brake mechanism 138 laterally in substantial alignment with the U-joint yoke and one directional clutch is still another advantage of the unit.

Other aspects, objects and advantages of this invention can be obtained from a study of the drawings, the disclosure and the appended claims.

We claim:

1. A countershaft transmission comprising:
   an input shaft, an output shaft and an intermediate shaft arranged in parallel relation;
   a reverse clutch assembly and a forward clutch assembly mounted on the input shaft;
   a first speed clutch assembly mounted on the output shaft;
   a second speed clutch assembly mounted on the intermediate shaft; and
   gear means mounted on the shafts and operatively associated with each other for effecting two forward and two reverse output shaft speeds in response to rotation of the input shaft and selective actuation of the clutch assemblies.

2. The countershaft transmission of claim 1 wherein one of the reverse and forward clutch assemblies, the first speed clutch assembly, and the second speed clutch assembly are in substantial radial alignment.

3. The countershaft transmission of claim 2 wherein the output shaft includes coupling means located in substantial radial alignment with one of the reverse and forward speed clutch assemblies.

4. The countershaft transmission of claim 2 including brake means for retarding rotation of the output shaft, the brake means being located on the intermediate shaft in substantial radial alignment with one of the reverse and forward clutch assemblies.

5. The countershaft transmission of claim 1 wherein the gear means includes first and second gears mounted for free rotation on the input shaft, a third gear mounted for free rotation on the output shaft, a fourth gear mounted for free rotation on the intermediate shaft, the reverse clutch assembly and forward clutch assembly selectively connecting the first and second gears respectively for conjoint rotation with the input shaft, the first speed clutch assembly selectively connecting the third gear for conjoint rotation with the output shaft, and the second speed clutch assembly selectively connecting the fourth gear of conjoint rotation with the intermediate shaft.

6. The countershaft transmission of claim 5 wherein the gear means includes a fifth gear mounted for joint rotation with the output shaft, and sixth and seventh gears mounted for joint rotation with the intermediate shaft, the first gear being intermeshed with the third gear, the third gear being intermeshed with the sixth gear, the second gear being intermeshed with the seventh gear, and the fourth gear being intermeshed with the fifth gear.

7. The countershaft transmission of claim 1 including a housing defining front and rear walls and brake means for retarding rotation of the output shaft, the brake means being located between the walls in substantial radial alignment with one of the reverse and forward clutch assemblies.

8. A countershaft transmission comprising:
   input, output and intermediate shafts arranged in parallel relation;
   forward and reverse gear and clutch means mounted on the input shaft for powerably rotating the output shaft in a forward mode or a reverse mode respectively;
   first speed gear and clutch means mounted on the output shaft for powerably rotating the output shaft in a first speed ratio mode and being operatively associated with the forward and reverse gear and clutch means; and
   second speed gear and clutch means mounted on the intermediate shaft for powerably rotating the output shaft in a second speed ratio mode and being operatively associated with the forward and reverse gear and clutch means and the first speed gear and clutch means so that two forward and two reverse speeds are provided.

9. The countershaft transmission of claim 8 wherein the forward and reverse gear and clutch means includes a forward clutch assembly and a reverse clutch assembly, the first speed gear and clutch means includes a first speed clutch assembly, and the second speed gear and clutch means includes a second speed clutch assembly, one of the forward and reverse clutch assemblies, the first speed clutch assembly and the second speed clutch assembly being in substantial radial alignment.

10. The countershaft transmission of claim 9 wherein the output shaft includes coupling means in substantial radial alignment with one of the forward and reverse clutch assemblies.

11. The countershaft transmission of claim 10 including brake means for retarding the rotational speed of the output shaft, the brake means being located on the intermediate shaft in substantial radial alignment with one of the forward and reverse clutch assemblies.

12. A countershaft transmission comprising:
   input, output and intermediate shafts arranged in parallel relation;
   first and second gears mounted for free rotation on the input shaft;
   first and second clutch means for selectively connecting the first and second gears respectively for conjoint rotation with the input shaft;
   a third gear mounted for free rotation on the output shaft;
   third clutch means for selectively connecting the third gear for conjoint rotation with the output shaft;
   a fourth gear mounted for free rotation on the intermediate shaft;
   a fourth clutch means for selectively connecting the fourth gear for conjoint rotation with the intermediate shaft; and
   a fifth gear mounted for joint rotation with the output shaft, and sixth and seventh gears mounted for joint rotation with the intermediate shaft, the first gear being intermeshed with the third gear, the third gear being intermeshed with the sixth gear, the second gear being intermeshed with the seventh gear, and the fourth gear being intermeshed with the fifth gear.

13. The countershaft transmission of claim 12 wherein first clutch means, the third clutch means, and the fourth clutch means are in substantial radial alignment.

14. The countershaft transmission of claim 13 wherein the output shaft includes a coupling means located in substantial radial alignment with the second clutch means.

15. The countershaft transmission of claim 14 including brake means for retarding rotation of the output shaft, the brake means being located on the intermediate shaft in substantial radial alignment with the second clutch means.

16. A countershaft transmission comprising:

an input shaft, an output shaft and an intermediate shaft arranged in parallel relation;

first, second and third clutch assemblies arranged on the input, output and intermediate shafts respectively in substantial radial alignment;

a fourth clutch assembly arranged on the input shaft in juxtaposed relationship with the first clutch assembly;

gear means mounted on the shafts and operatively associated with each other for providing two forward and two reverse output shaft speeds in response to rotation of the input shaft and selective actuation of the clutch assembies; and coupling means on the output shaft located in substantial radial alignment with the fourth clutch assembly.

17. The countershaft transmission of claim 16 including a housing and brake means for retarding rotation of the output shaft, the brake means being located on the intermediate shaft within the housing in substantial radial alignment with the fourth clutch assembly.

18. A countershaft transmission comprising:

an input shaft, an output shaft and an intermediate shaft arranged in parallel relation;

a reverse clutch assembly and a forward clutch assembly mounted on the input shaft;

a first speed clutch assembly mounted on the output shaft;

a second speed clutch assembly mounted on the intermediate shaft; and gear means mounted on the shafts and operatively associated with each other for effecting two forward and two reverse output shaft speeds in response to rotation of the input shaft and selective actuation of the clutch assemblies, the gear means including two gears mounted on the input shaft, two gears mounted on the output shaft, and three gears mounted on the intermediate shaft.

* * * * *